(12) United States Patent
Koo et al.

(10) Patent No.: US 8,199,138 B2
(45) Date of Patent: Jun. 12, 2012

(54) APPARATUS AND METHOD FOR DRIVING 2D/3D SWITCHABLE DISPLAY

(75) Inventors: Jae-phil Koo, Seoul (KR); Dae-sik Kim, Suwon-si (KR); Jae-seung Kim, Yongin-si (KR); Sang-moo Park, Uijeongbu-si (KR); Sergey Chestak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1213 days.

(21) Appl. No.: 11/940,527

(22) Filed: Nov. 15, 2007

(65) Prior Publication Data
US 2009/0009508 A1   Jan. 8, 2009

(30) Foreign Application Priority Data
Jul. 6, 2007   (KR) .................. 10-2007-0068185

(51) Int. Cl.
*G09G 5/00* (2006.01)

(52) U.S. Cl. ....................................... 345/204; 345/214

(58) Field of Classification Search ............ 345/87–100, 345/204, 690, 214
See application file for complete search history.

(56) References Cited

U.S. PATENT DOCUMENTS

| | | | |
|---|---|---|---|
| 2004/0120396 A1* | 6/2004 | Yun et al. | |
| 2005/0030301 A1* | 2/2005 | Harrold et al. | 345/204 |
| 2006/0209095 A1* | 9/2006 | Hsu | 345/690 |

* cited by examiner

*Primary Examiner* — Regina Liang
(74) *Attorney, Agent, or Firm* — Sughrue Mion, PLLC (57) ABSTRACT

Provided are an apparatus and method for driving a 2-dimensional (2D)/3-dimensional (3D) switchable display for improving the quality of image. The apparatus for driving a 2D/3D switchable display includes: an image mode determination unit determining whether input image signals of continuous frames are in a 2D mode or 3D mode; and an over-driving control unit over-driving the input image signal of a current differently according to the determined image mode. According to the apparatus and method, the response time in each of the 2D mode and the 3D mode can be increased, while motion blur and cross-talk effects can be decreased, thereby improving the quality of image.

20 Claims, 8 Drawing Sheets

| | CURRENT FRAME IMAGE DATA | | | | | | | | |
|---|---|---|---|---|---|---|---|---|---|
| GRADATION | 0 | 32 | 64 | 96 | 128 | 160 | 192 | 224 | 255 |
| 0 | | 44 | 96 | 152 | 216 | 248 | 255 | 255 | 255 |
| 32 | 0 | | 76 | 132 | 176 | 224 | 250 | 255 | 255 |
| 64 | 0 | 26 | | 110 | 156 | 208 | 238 | 255 | 255 |
| 96 | 0 | 16 | 56 | | 140 | 192 | 228 | 255 | 255 |
| 128 | 0 | 10 | 48 | 84 | | 176 | 220 | 248 | 255 |
| 160 | 0 | 6 | 40 | 76 | 116 | | 208 | 240 | 255 |
| 192 | 0 | 0 | 32 | 68 | 106 | 148 | | 234 | 255 |
| 224 | 0 | 0 | 24 | 58 | 94 | 132 | 176 | | 255 |
| 225 | 0 | 0 | 16 | 40 | 76 | 108 | 140 | 192 | |

(Previous frame image data shown in leftmost column)

FIG. 9

APPARATUS AND METHOD FOR DRIVING 2D/3D SWITCHABLE DISPLAY

CROSS-REFERENCE TO RELATED PATENT APPLICATIONS

This application claims priority from Korean Patent Application No. 10-2007-0068185, filed on Jul. 6, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to driving a 2-dimensional (2D)/3-dimensional (3D) switchable display, and more particularly, to driving a 2D/3D switchable display for improving the quality of an image.

2. Description of the Related Art

Figure 1:
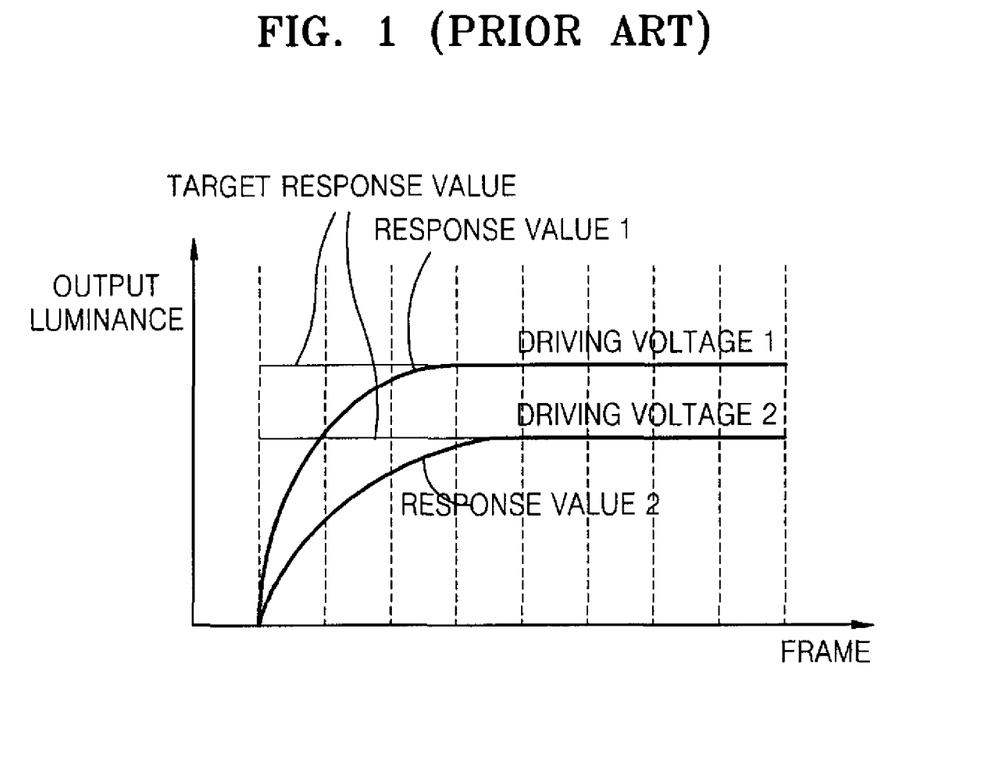
FIG. 1 is a graph illustrating response values with respect to driving voltages in a display apparatus according to conventional technology.

FIG. 1 is a graph illustrating response values with respect to driving voltages in a liquid crystal display apparatus according to conventional technology.

Referring to FIG. 1, output luminance values relative to two different driving voltages in an identical pixel are shown. The response values represent output luminance of the liquid crystal display. The driving voltages are voltages applied to the liquid crystal display corresponding to an image signal. Meanwhile, in the present specification, an image signal or a driving voltage means an image signal or a driving voltage in relation to each pixel of a frame. Referring to FIG. 1, when a response time is slow as in the liquid crystal display apparatus, the response value reaches a target response value only several frames after a change in the driving voltage occurs. In this way, when video clips having a lot of movement are watched on a liquid crystal display, artifacts such as ghost image or motion blur occurs.

Referring to FIG. 1, when a driving voltage is bigger, that is, in the case of a driving voltage 1 compared to a driving voltage 2, the response value of the display shows a steeper curve. Accordingly, in order to increase the response time of the liquid crystal display, an over-driving method is used. When an over-driving voltage is applied in a frame transition period, the response time in the period increases. Accordingly, when the over-driving voltage is applied to the transition period, the response time can be increased.

In order to remove motion blur of a liquid crystal panel related to the response time, a method of processing image data appropriately before a source driver drives the liquid crystal panel has been generally used. This method is referred to as a response time accelerator (RTA). The RTA essentially compares previous frame data with current frame data, and interpolates a different value that can accelerate a response time, according to the difference between the frame data, thereby increasing the response time of the liquid crystal panel.

In a time-division 2D/3D switchable display apparatus, if an RTA for removing motion blur in a 2D mode is directly applied to a 3D mode, compensation for a brightness value cannot be sufficiently performed, thereby causing a cross-talk phenomenon. Also, if an RTA for removing cross-talk in a 3D mode is directly applied to a 2D mode, compensation for a brightness value is performed excessively, thereby causing inverse motion blur.

SUMMARY OF THE INVENTION

The present invention provides an apparatus and method for driving a 2D/3D switchable display for compensating for brightness values which are different from each other in a 2D mode and in a 3D mode.

According to an aspect of the present invention, there is provided an apparatus for driving a 2-dimensional (2D)/3-dimensional (3D) switchable display, the apparatus including: an image mode determination unit which determines whether input image signals of continuous frames are in a 2D mode or 3D mode; and an over-driving control unit which over-drives an input image signal of a current frame differently according to the determined image mode.

In this case, an input image signal is a signal input to a pixel existing at a position corresponding to a predetermined position of each frame.

The over-driving control unit may over-drive the input image signal of the current frame differently according to a change between the input image signals of a previous frame and the current frame and the determined image mode.

If it is determined that the input image signal of the current frame is in the 2D mode, the over-driving control unit may over-drive the input image signal of the current frame so that the average response value of the input image signal for the current frame duration is approximate to a target response value.

If it is determined that the input image signal of the current frame is in the 3D mode, the over-driving control unit may over-drive the input image signal of the current frame so that the average response value of the input image signal for the current frame duration is approximate to a target response value.

The over-driving control unit may comprise a lookup table for each of the 2D mode and the 3D mode, the lookup tables being different from each other.

In the lookup tables, gradation values for the previous frame and the current frame of the input image signal may be compared and a gradation value corresponding to an applied over-driving voltage value may be determined.

If it is determined that the input image signal of the current frame is in the 2D mode, the over-driving voltage value may be set so that the average response value of the input image signal for the current frame duration is approximate to a target response value.

If it is determined that the input image signal of the current frame is in the 3D mode, the over-driving voltage value may be set so that the average response value of the input image signal for the current frame duration is approximate to a target response value.

According to whether or not a syntax indicating a stereo or multiview image included in the header information of each of the input image signals exists, the image mode determination unit may determine whether the input image signal is in the 2D mode or in the 3D mode.

According to whether or not a stereo sync signal generated from a 3D contents generator exists, the image mode determination unit may determine whether the_input image sig-nal_is in the 2D mode or in the 3D mode.

According to another aspect of the present invention, there is provided method of driving a 2D/3D switchable display, the method including: determining whether input image signals of continuous frames are in a 2D mode or 3D mode; and over-driving an input image signal of a current frame differently according to the determined image mode.

According to the exemplary apparatus and method, by applying an over-driving voltage to a time-division 2D/3D switchable display apparatus, the response time can be increased, thereby improving degradation of the picture quality of a 2D image due to a motion blur and degradation of the picture quality of a 3D image due to cross-talk. In this case, by applying a different over-driving voltage according to a 2D mode or a 3D mode, degradation of the picture quality of an image occurring when 2D and 3D switching is performed can be prevented.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2A:
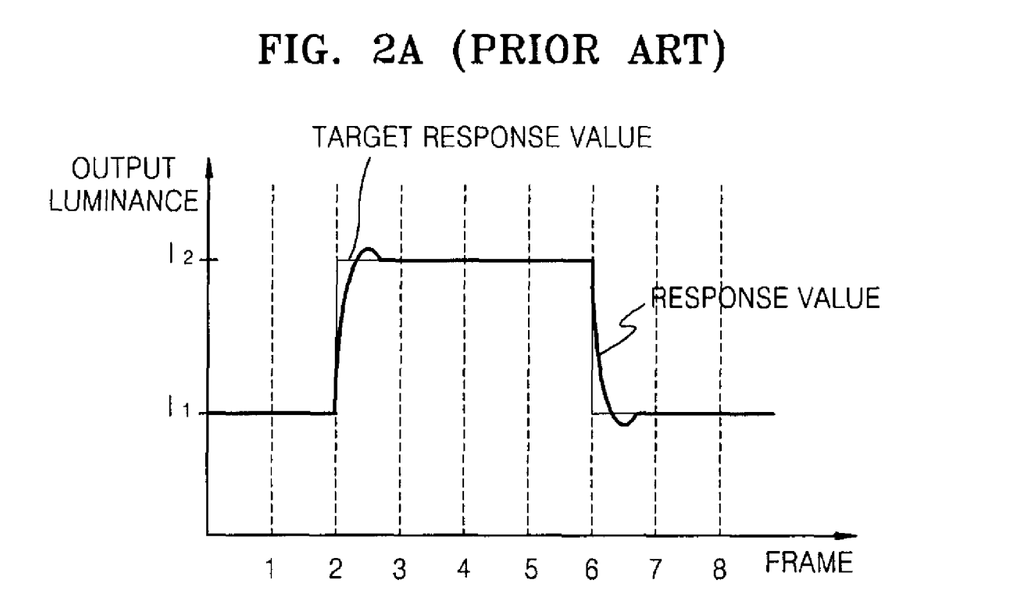
FIG. 2A is a graph illustrating responses of a pixel when an over-driving voltage is applied to a 2D image according to conventional technology.
Figure 2B:
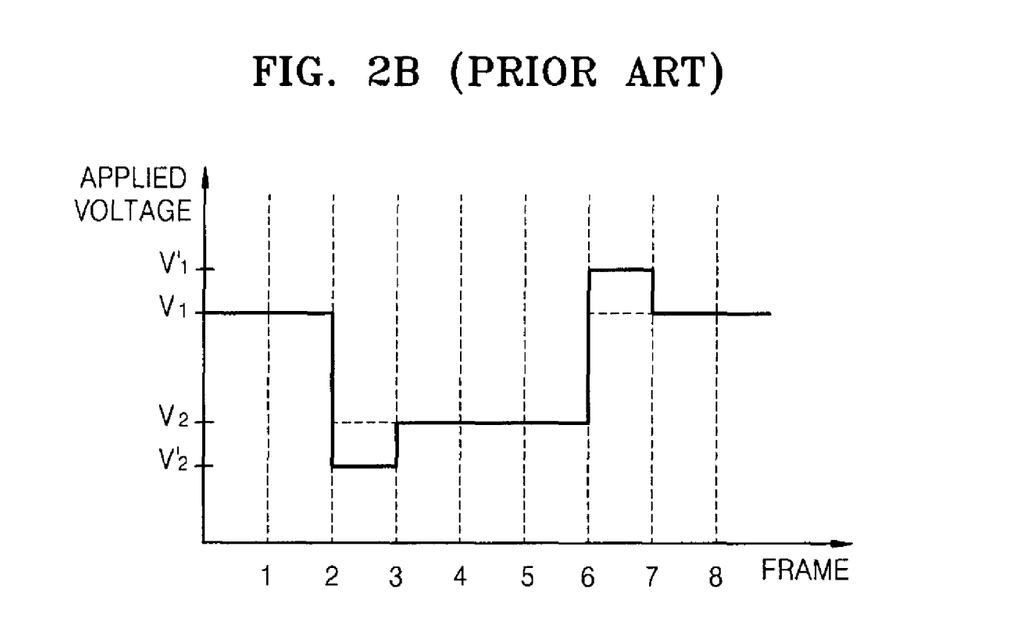
FIG. 2B is a graph of the over-driving voltage.

FIG. 2A is a graph illustrating response of a pixel when an over-driving voltage is applied to a 2D image according to conventional technology, and FIG. 2B is a graph of the over-driving voltage.

When an over-driving voltage is applied to a pixel of a display, the response time of the pixel is faster than that of a pixel to which an ordinary driving voltage is applied. Accordingly, when the response time is slow and therefore motion blur occurs, an over-driving voltage is applied in order to compensate for the motion blur. In this case, the driving voltage means a driving voltage for each pixel of a frame. FIG. 2A is a graph illustrating a response of pixels when an optimized over-driving voltage is applied in order to compensate for motion blur in 2D images which are sequentially input. Referring to FIGS. 2A and 2B, during a transition period between frame 2 and frame 3, in order to quickly respond to a target luminance $I_2$, an over-driving voltage $V_2'$ which is obtained through experimentation, not a driving voltage $V_2$, should be applied. Likewise, during a transition period between frame 6 and frame 7, in order to quickly respond to a target luminance $I_1$, an over-driving voltage $V_1'$ which is obtained through experimentation, not a driving voltage $V_1$, should be applied. In this case, if an excessive over-driving voltage is applied, inverse motion blur occurs, and if an insufficient over-driving voltage is applied, motion blur occurs as before. FIG. 2B illustrates applied driving voltages and over-driving voltages. $V_1$ and $V_2$ are applied driving voltages when no compensation is performed, and $V_1'$ and $V_2'$ are applied over-driving voltages.

Figure 3:
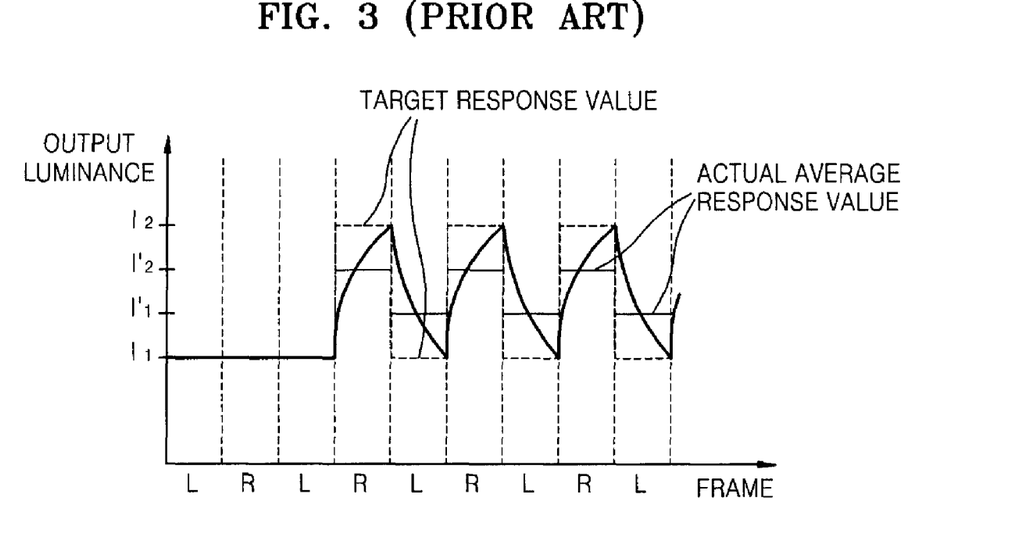
FIG. 3 is a graph illustrating responses of a pixel when the over-driving voltage illustrated in FIG. 2B is applied to a 3D image according to conventional technology.

FIG. 3 is a graph illustrating response of a pixel when the over-driving voltage illustrated in FIG. 2B is applied to a 3D image according to conventional technology.

Referring to FIG. 3, if an over-driving voltage optimized in a 2D mode is directly applied to a 3D mode in order to increase the response time of a display, a case where a target luminance cannot be expressed occurs. Though the picture quality of a 2D image improves, in the case of a 3D image, the target luminance values of a left eye image and a right eye image cannot be satisfied. In order to optimize an image in a 3D mode, the average response value should be the same as a target response value. The target response value is $I_1$ for a left eye image and $I_2$ for a right eye image. However, the actual average response values are $I_1'$ for a left eye image and $I_2'$ for a right eye image and sufficient compensation of brightness values is not performed. Accordingly, as a cross-talk phenomenon, the motion blur of a right eye image remains in a left eye image and the motion blur of a left eye image remains in a right eye image.

Figure 4A:
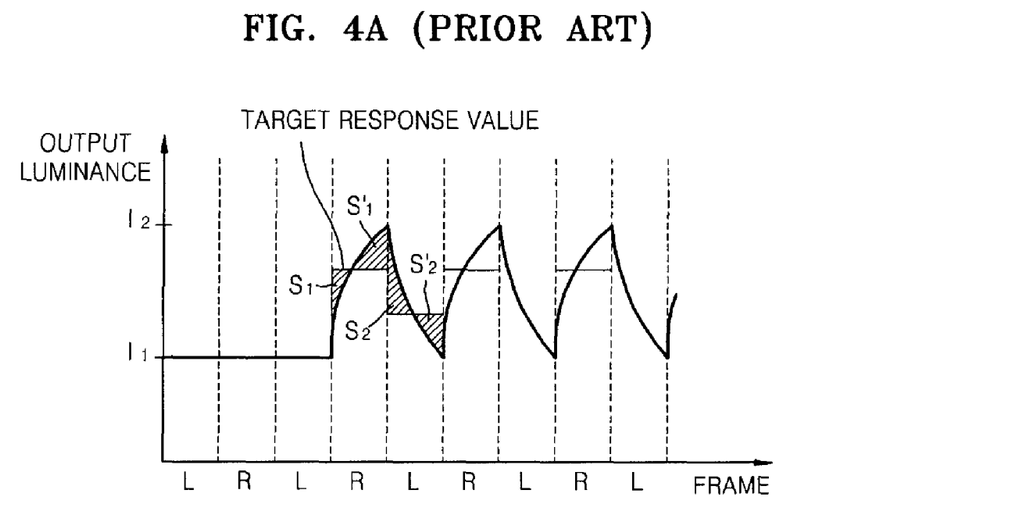
FIG. 4A is a graph illustrating responses of pixels when an optimized over-driving voltage is applied to a 3D image according to conventional technology.
Figure 4B:
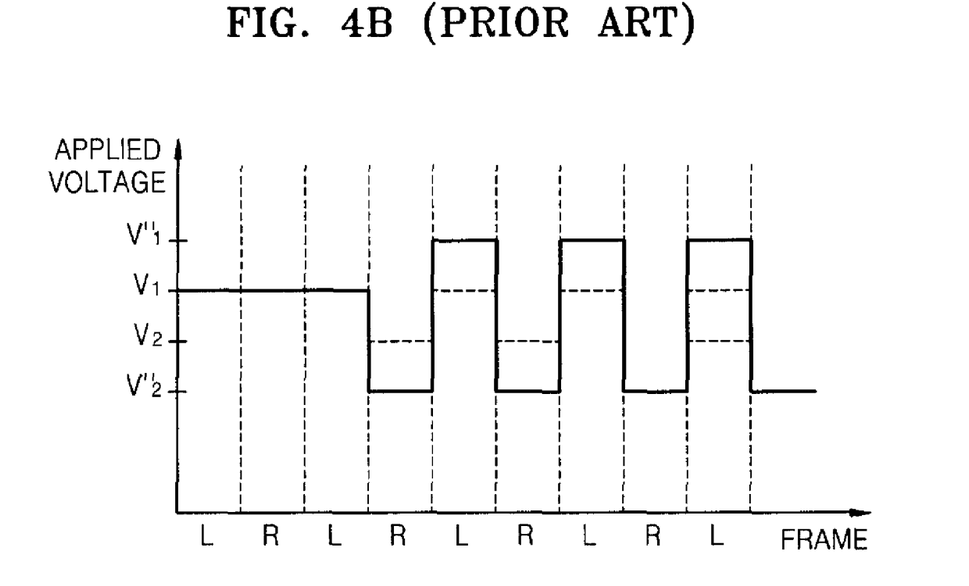
FIG. 4B is a graph of the over-driving voltage.

FIG. 4A is a graph illustrating responses of pixels when an optimized over-driving voltage is applied to a 3D image according to conventional technology, and FIG. 4B is a graph illustrating the over-driving voltage.

FIG. 4A illustrates a response shown when a driving voltage is applied in order to compensate for cross-talk in sequentially input 3D image. In a 3D mode, in order to compensate for cross-talk, a target luminance (response value) should be the same as the average response value. Accordingly, in the case of a right eye image, in order to make the average response value satisfy an output luminance $I_2$, an area $S_1$ should be the same as an area $S_1'$, and in the case of a left eye image, in order to make the average response value satisfy an output luminance $I_2$, an area $S_2$ should be the same as an area $S_2'$. When over-driving voltages $V_1''$ and $V_2''$ illustrated in FIG. 4B satisfying the above conditions are applied, cross-talk is compensated for and an optimized image can be output.

Figure 5:
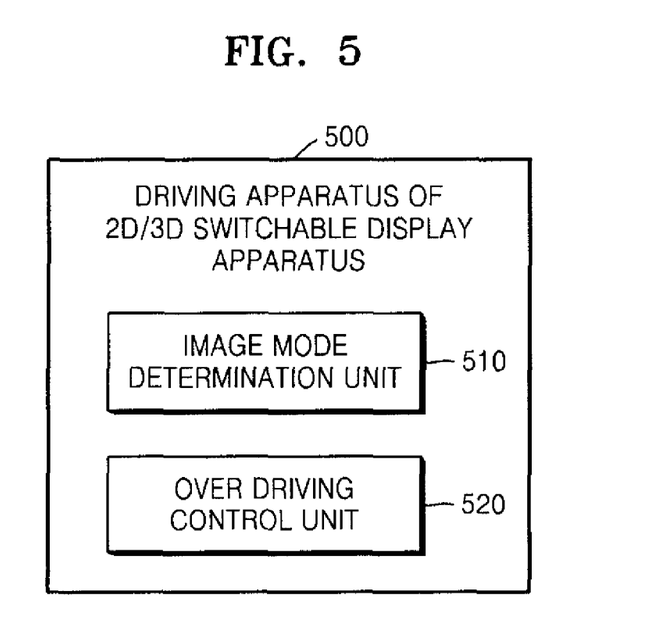
FIG. 5 is a block diagram illustrating a structure of a driving apparatus for driving a 2D/3D switchable display, according to an exemplary embodiment of the present invention.

FIG. 5 is a block diagram illustrating a structure of a driving apparatus 500 for driving a 2D/3D switchable display, according to an exemplary embodiment of the present invention. Referring to FIG. 5, the driving apparatus 500 according to the current exemplary embodiment includes an image mode determination unit 510 and an over-driving control unit 520.

When an image input signal is received by a 2D/3D switchable display, the image mode determination unit 510 determines whether the mode of the image input signal is 2D or 3D. For example, whether the input image signal is in a 2D mode or in a 3D mode can be determined based on whether or not a syntax indicating a stereo or multiview image, included in the header information of the input image signal exists. By adding a syntax indicating a stereo or multiview image (for example, information on whether or not a camera parameter exists, or the number of cameras, etc.) in the header of an image sequence signal input through a storage medium or through broadcasting, and decoding the syntax, the 3D mode can be determined. If there is no syntax, the mode is determined to be 2D.

In another exemplary embodiment, the image mode determination unit 510 can determine based on the presence of a stereo sync signal generated by a 3D contents generator, whether the input image signal is in a 2D mode or 3D mode. Whether or not the corresponding digital contents are in a 3D mode can be determined by the presence of a stereo sync signal which is generated when a 3D game is executed in a 3D console game machine or when a web 3D application is executed in a personal computer (PC).

Figure 6A:
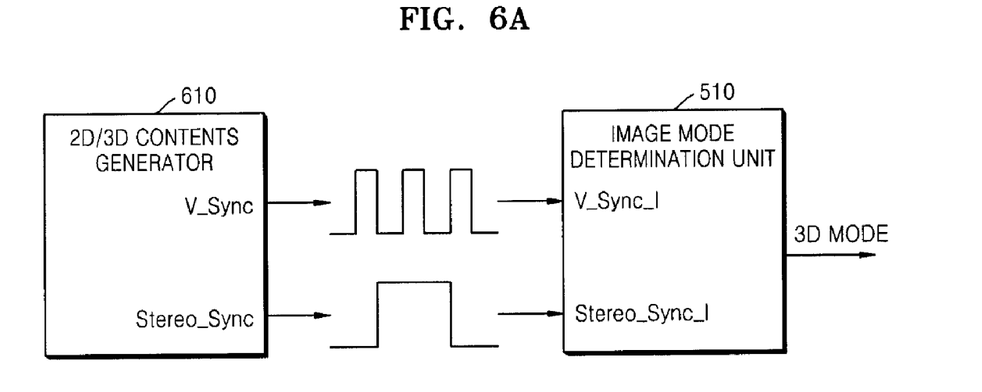
FIGS. 6A and 6B are diagrams for explaining examples of determining a 2D or 3D mode according to an exemplary embodiment of the present invention.
Figure 6B:
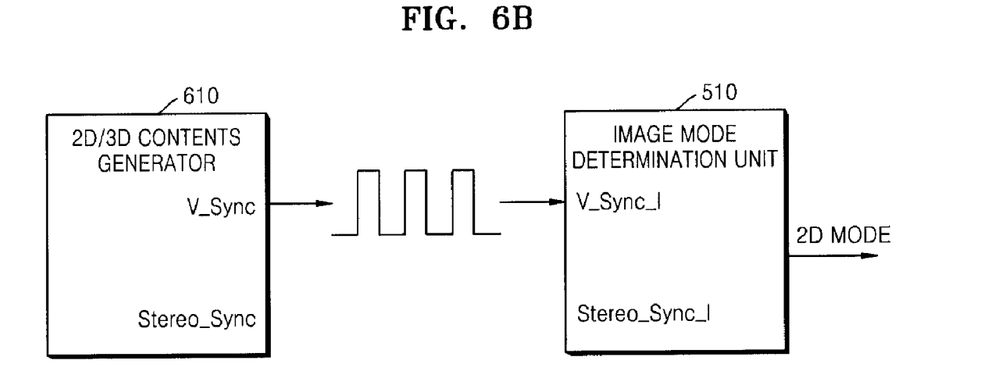

FIGS. 6A and 6B are diagrams for explaining examples of determining a 2D or 3D mode according to an exemplary embodiment of the present invention. Referring to FIG. 6A, a 2D/3D contents generator 610 can generate a V_Sync signal and a Stereo_Sync signal. In the present invention, the Stereo_Sync signal is a stereo synchronization signal. If a Stereo_Sync signal is received, the image mode determination unit 510 can determine that the image mode is a 3D mode. If a Stereo_Sync signal isn't received, the image mode determination unit 510 can determine that the image mode is a 2D mode. The method of determining a 2D or 3D mode is not limited by the two methods.

The over-driving control unit 520 over-drives the input image signal of the current frame differently according to the determined image mode. Also, in each mode, according to the change between a previous frame and a current frame, the input image signal of the current frame is over-driven. If the input image signal is determined to be in a 2D mode, the input image signal of the current frame is over-driven so that the average response value of the input image signal can approximate to a target response value for the current frame durations. If the input image signal is determined to be in a 3D mode, the input image signal of the current frame is over-driven so that the average response value of the left eye or right eye image signal can approximate to a target response value for the current frame durations. In order to express an identical luminance value, the over-driving voltage in a 2D mode and the over-driving voltage in a 3D mode are made to be different from each other, thereby removing motion blur in the 2D mode and cross-talk in the 3D mode.

Figure 7:
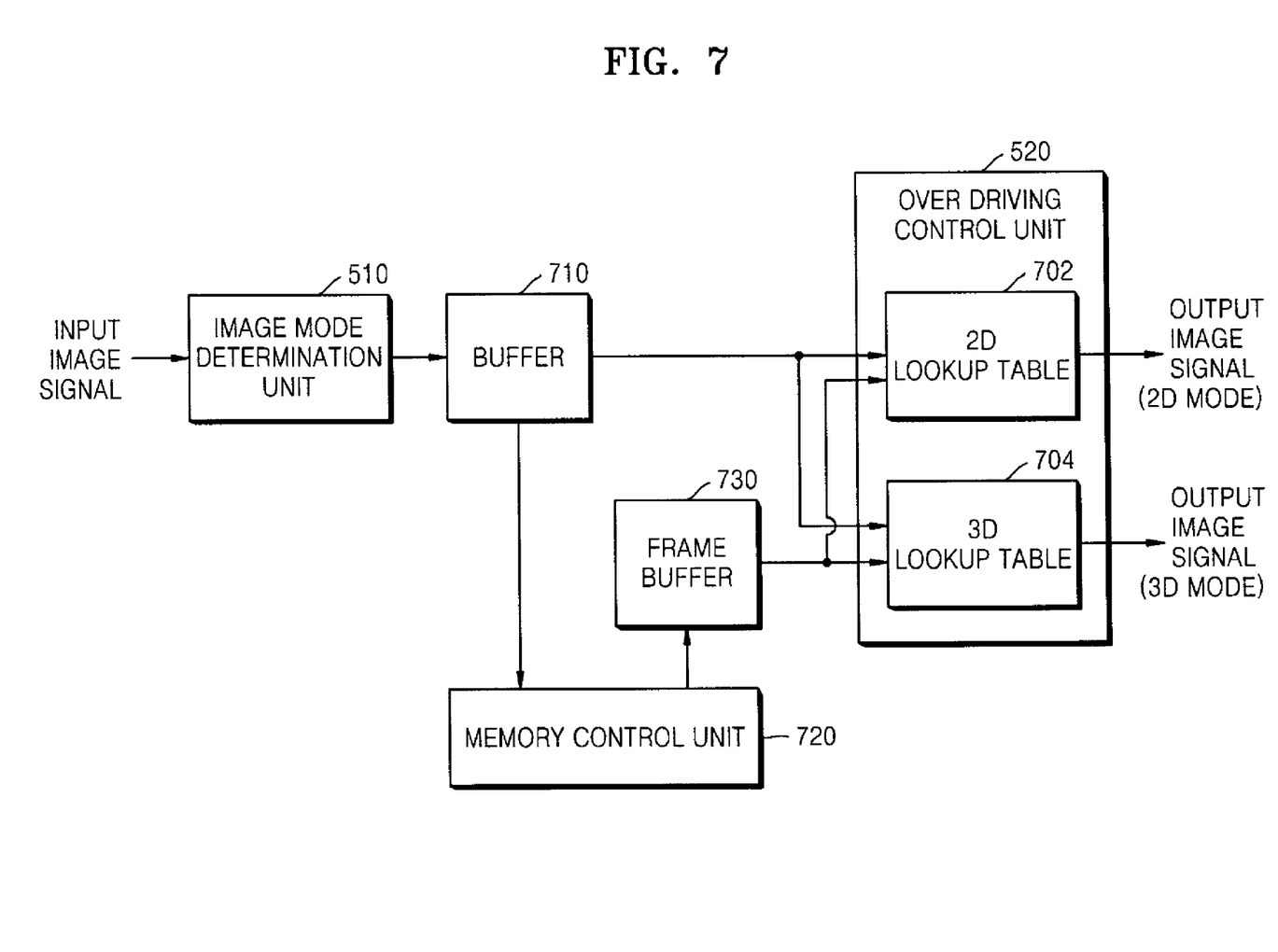
FIG. 7 is a more detailed block diagram illustrating a structure of the driving apparatus illustrated in FIG. 5, according to an exemplary embodiment of the present invention.

FIG. 7 is a more detailed block diagram illustrating a structure of the driving apparatus 500 illustrated in FIG. 5, according to an exemplary embodiment of the present invention.

Referring to FIG. 7, the driving apparatus 500 for driving a 2D/3D switchable display according to the current exemplary embodiment includes the image mode determination unit 510, a buffer 710, a memory control unit 720, a frame buffer 730, and the over-driving control unit 520. Also, the over-driving control unit 520 includes a 2D lookup table 702 and a 3D lookup table 704.

Referring to FIG. 7, the image mode determination unit 510 is positioned before the buffer 710, but the present invention is not limited by this arrangement. The image mode determination unit 510 needs only to be positioned before lookup tables of the over-driving control unit 520. The buffer 710 stores input image data, and for example, can be a line memory for storing input images in units of lines. The memory control unit 720 transfers the address of current input image data to the frame buffer 730. The frame buffer 730 updates and stores the image data of a previous frame. Here, the frame buffer 730 stores image data of the previous frame which is transmitted to a pixel at the same position of the display panel as the position of the pixel of the corresponding image data of the current frame. If it is assumed that frame 1, frame 2, and frame 3 are sequentially input, and if the current frame is frame 2, the image data of frame 1 is stored in the frame buffer 730, and if the current frame is frame 3, the image data of frame 2 is stored in the frame buffer 730.

In order to remove motion blur and crosstalk and in order to obtain an optimized response according to a change between a previous image signal and a current image signal, in the case of 2D, the over-driving voltages $V_1'$ and $V_2'$ illustrated in FIG. 2B and in the case of 3D, the over-driving voltages $V_1''$ and, $V_2''$ illustrated in FIG. 4B should be applied. For this, in the case of a 2D mode, the 2D lookup table 702 and in the case of a 3D mode, the 3D lookup table 704 should be used. Data stored in the 2D lookup table 702 is experimentally obtained in advance so that the average response value of an image signal for the current frame durations of a current frame can approximate to a target response value. Likewise, data stored in the 3D lookup table 704 is experimentally obtained in advance so that the average response value of an image signal for the current frame durations of a current frame can approximate to a target response value. Data in a lookup table is expressed as an integer (a gradation value) of 8 bits (0~255). The gradation values of a previous frame and a current frame of the input image signal are compared, and a gradation value corresponding to an applied over-driving voltage value is determined.

Figure 8:
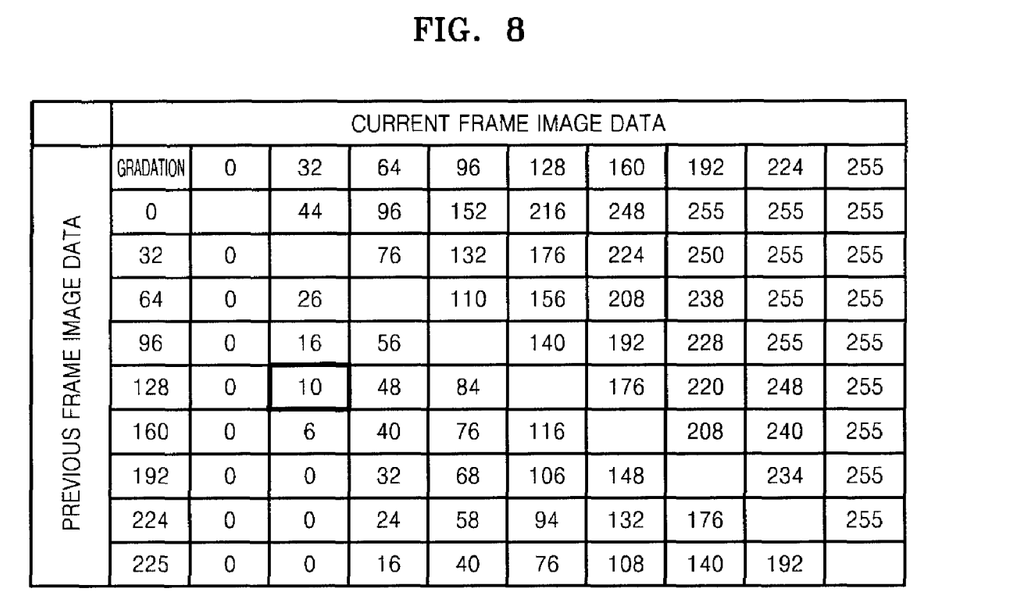
FIG. 8 is a diagram illustrating an example of a lookup table according to an exemplary embodiment of the present invention.

FIG. 8 is a diagram illustrating an example of a lookup table according to an exemplary embodiment of the present invention. Referring to FIG. 8, gradation values of image data of a current frame and gradation values of image data of a previous frame are set in the lookup table. A gradation voltage corresponding to a gradation value is applied as an over-driving voltage. For example, if the gradation value of a pixel of a current frame is 32 and the gradation value to be expressed at an identical pixel of a previous frame is 128, a gradation value corresponding to a gradation value '10' is output based on the lookup table. In FIG. 8, the lookup table is formed as a 9×9 table, but the lookup table is not limited thereto, and can be formed as an m×n (m: 1~255, n: 1~255) table. The value corresponding to each gradation value can be experimentally obtained for each mode. If a target luminance value is determined by using the lookup table, a display unit (not shown) applies a driving voltage according to the determined target luminance value of the current frame to the corresponding pixel. Meanwhile, if no change between the input image signals of the previous frame and the current frame exists, the driving voltage is maintained without change.

Figure 9:
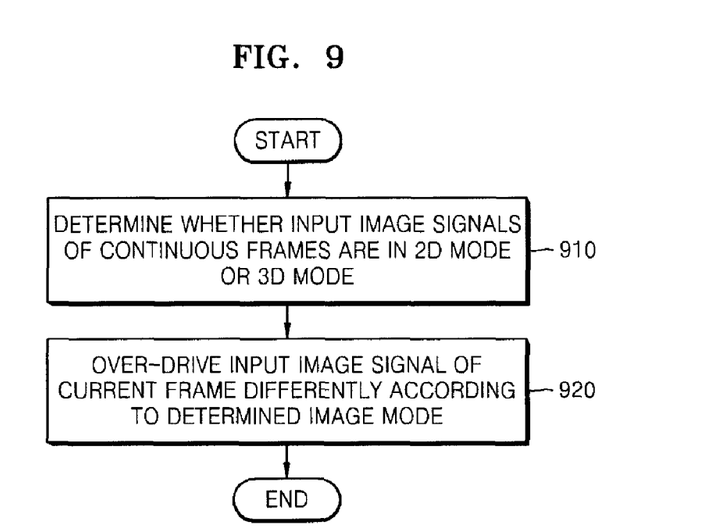
FIG. 9 is a flowchart illustrating a method of driving an apparatus for driving a 2D/3D switchable display, according to an exemplary embodiment of the present invention.

FIG. 9 is a flowchart illustrating a method of driving an apparatus for driving a 2D/3D switchable display, according to an exemplary embodiment of the present invention.

In operation 910, it is determined whether input image signals for continuous frames are in a 2D mode or in a 3D mode. This can be determined based on whether or not a syntax indicating a stereo or multiview image included in header information of the input image signals exists, or whether or not a stereo sync signal generated from a 3D contents generator exists.

In operation 920, according to the determined image mode, the input image signal of the current frame is over-driven differently. Also, according to the determined image mode and a change between the input image signals of the previous frame and the current frame, the input image signal of the current frame may be over-driven differently. If the input image signal is determined to be in a 2D mode, the input image signal of the current frame is over-driven so that the average response value of the input image signal for the current frame durations can approximate to a target response value. If the input image signal is determined to be in a 3D mode, the input image signal of the current frame is over-driven so that the average response value of the input image signal for the current frame durations can approximate to a target response value.

Figure 10:
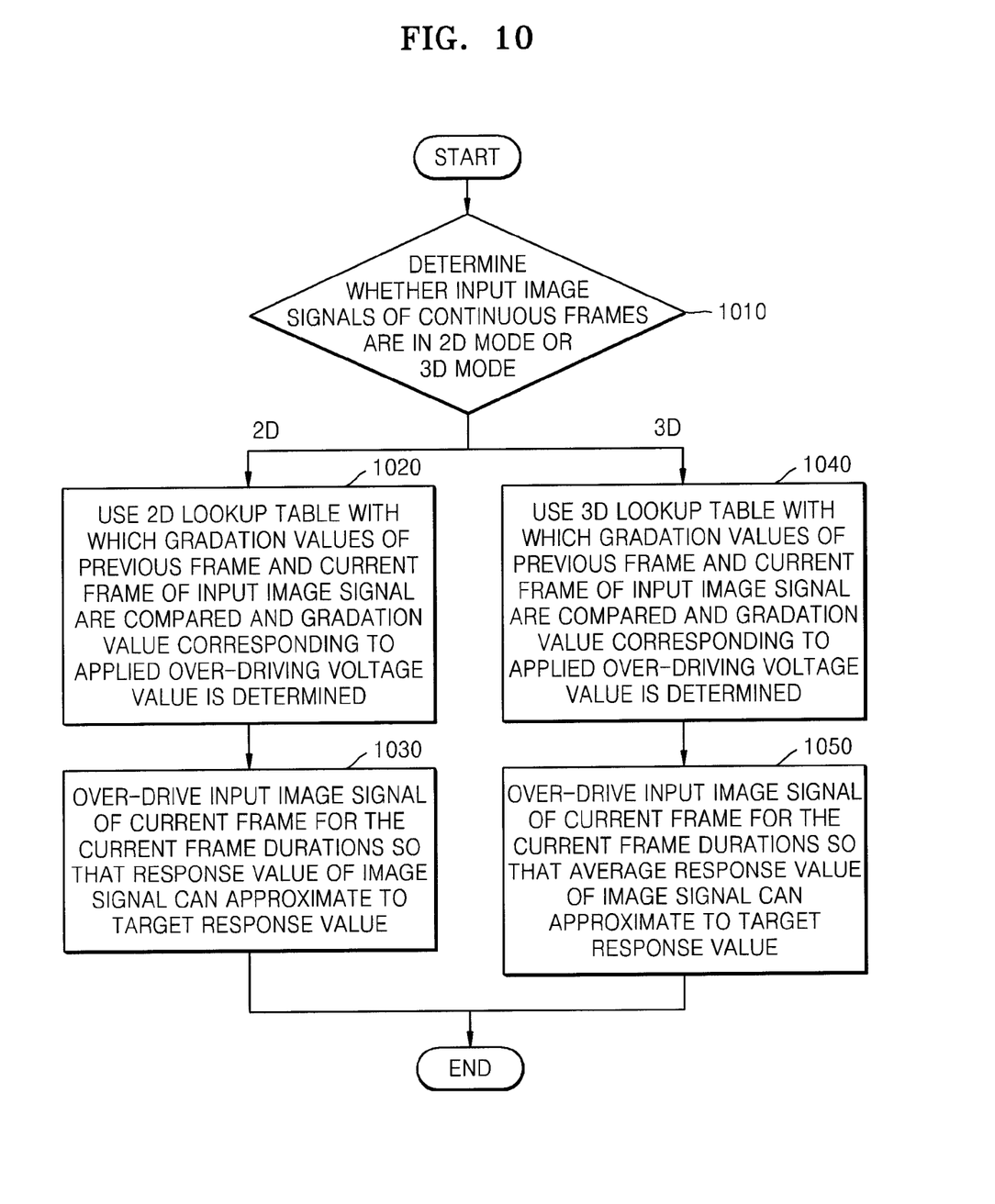
FIG. 10 is a flowchart illustrating a method of driving an apparatus for driving a 2D/3D switchable display, according to an exemplary embodiment of the present invention.

FIG. 10 is a flowchart illustrating a method of driving an apparatus for driving a 2D/3D switchable display using a lookup table, according to an exemplary embodiment of the present invention.

In operation 1010, it is determined whether input image signals for continuous frames are in a 2D mode or in a 3D mode.

If the input image signals are in a 2D mode, in operation 1020, a 2D lookup table is used in which the gradation values of a previous frame and a current frame of an input image signal at pixels of an identical position are compared and a gradation value corresponding to an applied over-driving voltage value is determined.

In operation 1030, by using the 2D lookup table, the input image signal of the current frame is over-driven so that the average response value of the input image signal for the current frame durations can approximate to a target response value.

If the input image signal is in a 3D mode, in operation 1040, a 3D lookup table is used in which the gradation values of a previous frame and a current frame of input left eye and right eye image signals at pixels of an identical position are compared and a gradation value corresponding to an applied overdriving voltage value is determined.

In operation 1050, by using the 3D lookup table, the input image signal of the current frame is over-driven so that the average response value of the input image signal for the current frame durations can approximate to a target response value. Though not shown in the drawings, if no change between the input image signals of the previous frame and the current frame occurs, the driving voltage is maintained without change.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for driving a 2-dimensional (2D)/3-dimensional (3D) switchable display, the apparatus comprising:
    an image mode determination unit which determines whether input image signals of continuous current frames are in a 2D mode or 3D mode; and
    an over-driving control unit which over-drives the input image signal of a current frame differently according to the determined image mode.

2. The apparatus of claim 1, wherein the over-driving control unit over-drives the input image signal of the current frame differently according to a change between the input image signals of a previous frame and the current frame and the determined image mode.

3. The apparatus of claim 1, wherein, if it is determined that the input image signal of the current frame is in the 2D mode, the over-driving control unit over-drives the input image signal of the current frame so that the average response value of the input image signal for the current frame duration is approximate to a target response value.

4. The apparatus of claim 1, wherein, if it is determined that the input image signal of the current frame is in the 3D mode, the over-driving control unit over-drives the input image signal of the current frame so that the average response value of the input image for the current frame duration is approximate to a target response value.

5. The apparatus of claim 1, wherein the over-driving control unit comprises a lookup table for each of the 2D mode and the 3D mode, the lookup tables being different from each other.

6. The apparatus of claim 5, wherein, in the lookup tables, gradation values for the previous frame and the current frame of the input image signal are compared and a gradation value corresponding to an applied over-driving voltage value is determined.

7. The apparatus of claim 6, wherein, if it is determined that the input image signal of the current frame is in the 2D mode, the over-driving voltage value is set so that the average response value of the input image signal for the current frame duration is approximate to a target response value.

8. The apparatus of claim 6, wherein, if it is determined that the input image signal of the current frame is in the 3D mode, the over-driving voltage value is set so that the average response value of the input image signal for the current frame duration is approximate to a target response value.

9. The apparatus of claim 1, wherein, according to whether or not a syntax indicating a stereo or multiview image included in the header information of each of the input image signals exists, the image mode determination unit determines whether the input image signal is in the 2D mode or in the 3D mode.

10. The apparatus of claim 1, wherein, according to whether or not a stereo sync signal generated from a 3D contents generator exists, the image mode determination unit determines whether the input image signal is in the 2D mode or in the 3D mode.

11. A method of driving a 2D/3D switchable display, the method comprising:
    determining whether input image signals of continuous current frames are in a 2D mode or 3D mode; and
    over-driving the input image signal of a current frame differently according to the determined image mode.

12. The method of claim 11, wherein the over-driving of the input image signal of the current frame comprises over-driving the input image signal of the current frame differently according to a change between the input image signals of a previous frame and the current frame and the determined image mode.

13. The method of claim 11, wherein the over-driving of the input image signal of the current frame comprises, if it is determined that the input image signal is in the 2D mode, over-driving the input image signal of the current frame so that the average response value of the input image signal for the current frame duration is approximate to a target response value.

14. The method of claim 11, wherein the over-driving of the input image signal of the current frame comprises, if it is determined that the input image signal is in the 3D mode, over-driving the input image signal of the current frame so that the average response value of the input image for the current frame duration is approximate to a target response value.

15. The method of claim 11, wherein the over-driving of the input image signal of the current frame comprises over-driving the input image signal by using a lookup table in which gradation values for the previous frame and the current frame of the input image signal are compared, and determining a gradation value corresponding to an applied over-driving voltage value.

16. The method of claim 15, wherein, if it is determined that the input image signal is in the 2D mode, the over-driving voltage value is set so that the average response value of the input image signal for the current frame duration is approximate to a target response value.

17. The method of claim 15, wherein, if it is determined that the input image signal is in the 3D mode, the over-driving voltage value is set so that the average response value of the input image signal for the current frame duration is approximate to a target response value.

18. The method of claim 11, wherein the determining of whether the input image signal is in the 2D mode or 3D mode comprises determining whether or not a syntax indicating a stereo or multiview image, included in the header information of the input image signal, exists.

19. The method of claim 11, wherein the determining of whether the input image signal is in the 2D mode or 3D mode comprises determining whether or not a stereo sync signal generated from a 3D contents generator exists.

20. A non-transitory computer readable recording medium having embodied thereon a computer program for executing a method of driving a 2D/3D switchable display, the method comprising:

determining whether input image signals of continuous current frames are in a 2D mode or 3D mode; and over-driving the input image signal of a current frame differently according to the determined image mode.

* * * * *